H. H. JEWELL.
DIRECTION INDICATOR.
APPLICATION FILED SEPT. 9, 1920.
1,388,570.
Patented Aug. 23, 1921.
2 SHEETS—SHEET 1.
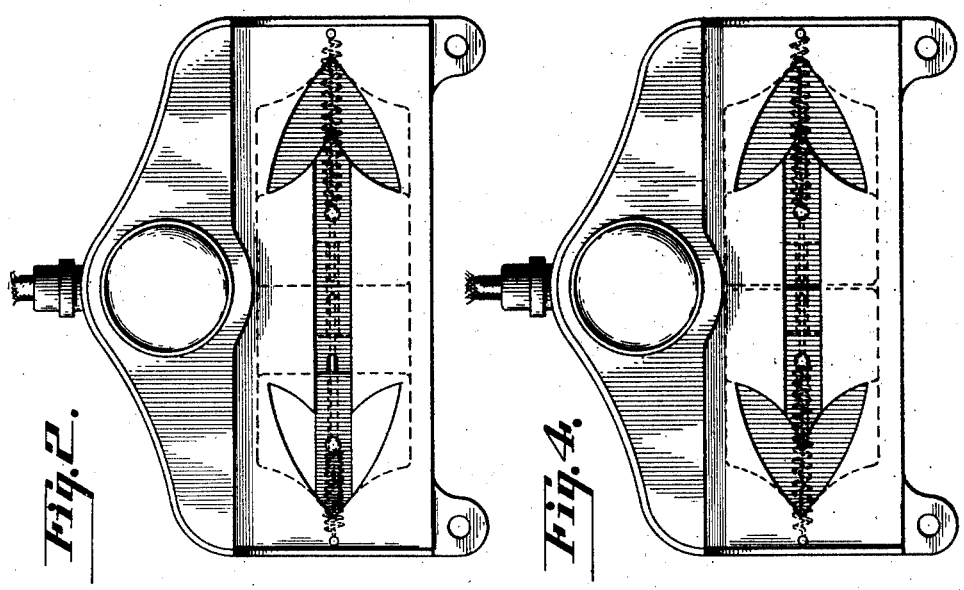
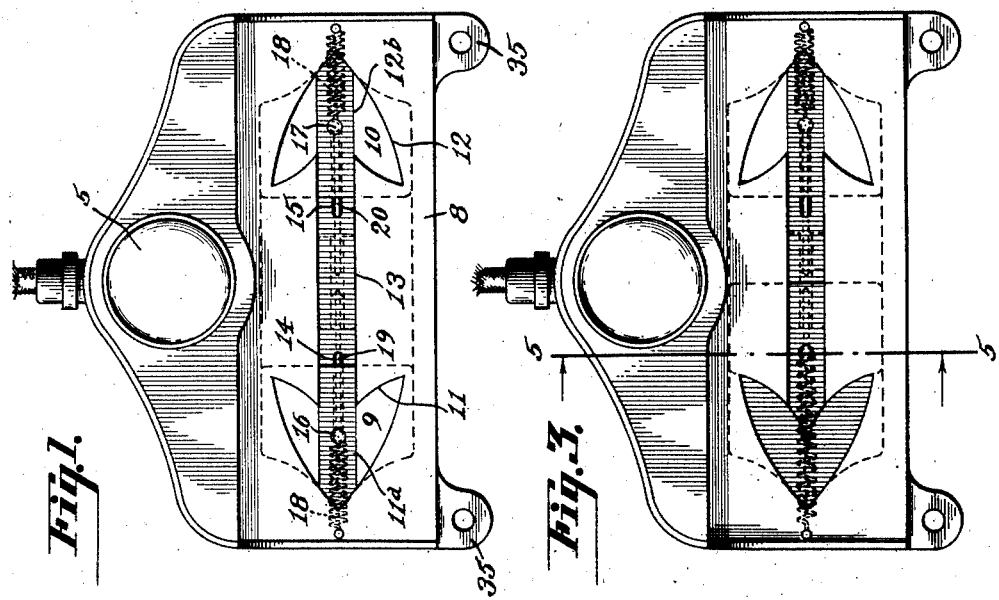
Inventor
Harry H Jewell.
By Chas. E. Torment
His Atty.

H. H. JEWELL.
DIRECTION INDICATOR.
APPLICATION FILED SEPT. 9, 1920.
1,388,570.
Patented Aug. 23, 1921.
2 SHEETS—SHEET 2.
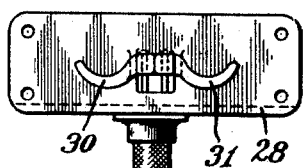
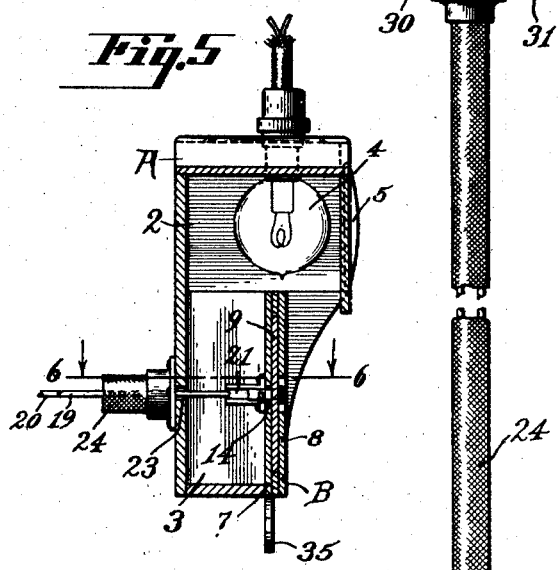
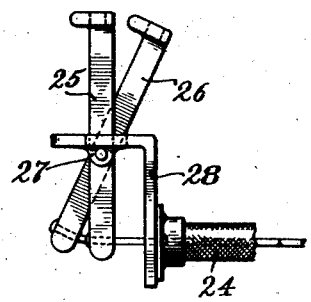
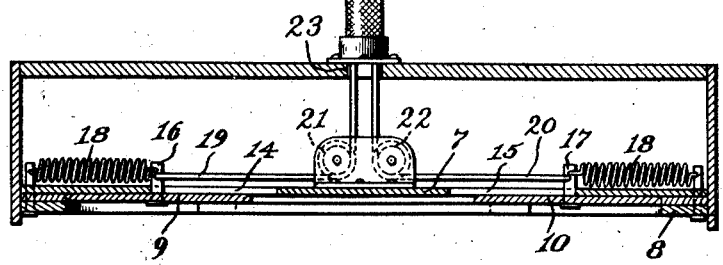
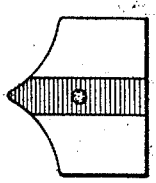
Inventor
Harry H. Jewell.
By Chas E Townsend
His Atty.

UNITED STATES PATENT OFFICE.

HARRY H. JEWELL, OF OAKLAND, CALIFORNIA.

DIRECTION-INDICATOR.

1,388,570.   Specification of Letters Patent.   Patented Aug. 23, 1921.

Application filed September 9, 1920. Serial No. 409,181.

*To all whom it may concern:*

Be it known that I, HARRY H. JEWELL, a citizen of the United States, residing at Oakland, in the county of Alameda and State of California, have invented a new and useful Improvement in Direction-Indicators, of which the following is a specification.

This invention relates to a direction indicator and especially to a manually actuated device which is capable of visibly indicating the intended direction or movement of an automobile.

One of the objects of the present invention is to provide a simple, substantial and cheaply manufactured direction indicator for automobiles and like vehicles which may be easily installed on any automobile and readily and quickly operated when required.

Another object of the invention is to provide a direction indicator which may serve as a support for the license plate and which may be used in place of the customary tail light; further to so arrange the light within the casing inclosing the direction indicator that it will serve as a tail light and simultaneously illuminate the license plate and the direction indicating means, thereby rendering the device equally serviceable whether for night or day service.

Further objects will hereinafter appear.

The invention consists of the parts and the construction, combination and arrangement of parts as hereinafter more fully described and claimed, having reference to the accompanying drawings, in which—

Figures 1, 2, 3 and 4 are end views of the direction indicator, Fig. 1 showing the signal set for straight ahead; Fig. 2 showing the position of the signal when turning to the right; Fig. 3 showing the position of the signal when turning to the left, and Fig. 4 the position of the signal when it is intended to stop.

Fig. 5 is an enlarged vertical cross section taken on line 5—5, Fig. 3.

Fig. 6 is an enlarged plan section taken on line 6—6, Fig. 5.

Fig. 7 is a detail view of the operating levers.

Fig. 8 is a detail view of one of the direction indicating slides.

Referring to the drawings in detail, A indicates a casing, substantially rectangular in shape, in which is formed an upper and a lower compartment indicated at 2 and 3.

The upper compartment contains an electric bulb 4 disposed directly behind a tail light lens 5 and above a direction indicating plate generally indicated at B to permit said plate to be illuminated by direct rays and reflection from the upper part of the casing.

The plate B consists of two plates as indicated at 7 and 8. These plates are slightly interspaced to receive a pair of sliding plates 9 and 10. The exterior plate 8 is rectangular in shape and is cut to form a pair of arrow heads 11 and 12 and a connecting bar 13. The inner plate 7 is slotted as at 14 and 15 to permit the pins indicated at 16 and 17 to project through the respective slots. The pins 16 and 17 are secured one to each sliding plate and they serve the function of transmitting a sliding movement thereto. The pins 16 and 17 are each connected with springs 18 and they are also connected with flexible wires as indicated at 19 and 20. The respective wires pass over guide pulleys 21 and 22 and then through an opening 23 formed in the rear part of the casing. They are then passed through a flexible tube 24 and are finally attached to the lower ends of a pair of operating levers 25 and 26.

The operating levers are pivotally supported, as at 27, in a bracket 28; said bracket being attached to the instrument board of an automobile, the steering column or at any other point within convenient reach of the driver. These levers are employed for the purpose of transmitting a sliding movement to the plates 9 and 10 in one direction when the signal is to be operated, and they are otherwise returned to normal vertical position, as shown in Fig. 7, by the pull of the respective springs 18.

The formation of the double arrow in the exterior plate 8 causes the inner plate 7 to be exposed during certain positions of the respective sliding plates 11 and 12. That portion of the plate 7 which registers with the openings produced by the arrow heads is for this reason painted red, similarly that portion which registers with the connecting bar 13. The reason for coloring the rear plate will be more fully described.

The sliding plates 9 and 10 are both painted white with the exception of a red stripe extending from end to end of each plate in alinement with the connecting bar 13; the red stripes on the respective sliding plates being indicated at 11ª and 12ᵇ. The exterior face of the plate 8 is also painted white and it can therefore be seen that a white surface and a red bar will be displayed as shown in Fig. 1 when the sliding plates 11 and 12 assume their normal position; this being due to the fact that the major portion of the respective sliding plates is painted white and serves as a covering for that portion of the plate 7 which registers with the arrow heads formed in the exterior plate 8. The display of a red bar extending approximately from end to end of the white painted or colored plate 8 indicates that the driver intends to travel ahead. If he intends to stop it is only necessary to pull the hand operated levers 25 and 26 rearwardly in unison; this being accomplished by placing one finger in each handle projection indicated at 30 and 31. Pulling of both levers to an angular position causes a forward pull of the flexible wires or cables 21 and 22 and a sliding movement of the plates 9 and 10 toward each other to assume the position shown in Fig. 4 is thus produced as the cables 21 and 22 are attached to the respective pins 16 and 17. A red bar and two arrow heads will now be displayed due to the fact that that portion of the inner plate 7 which registers with the arrow heads in the front plate 8 is now uncovered and as it is painted red two red arrow heads and a connecting bar will be displayed. This indicates that the driver intends to stop and this signal is of course displayed until the vehicle comes to a stop. The driver may then release the two levers and these will automatically return to normal vertical position due to the pull exerted by the springs 18. The sliding plates 9 and 10 will thus return to normal position and the red bar will again be displayed. If it is desired to turn to the right, it is only necessary to operate the lever indicated at 26. Such operation will produce a pull on the cable 22 and the pin 17 to which the sliding plate 10 is attached. This plate will therefore slide inwardly and assume the position shown in Fig. 3, thus displaying a red bar and an arrow head pointing to the right. Again if it is desired to turn to the left it is obvious that the lever 25 is operated and that an arrow pointing to the left will then be displayed.

The invention contains several important features, first, it must be admitted that the structure is exceedingly simple in design and contains comparatively few moving parts, in fact the only moving parts employed are the levers 25 and 26, the sliding plates 9 and 10, and the cables forming the connection between the sliding plates and the operating levers. Secondly, the use of a direction indicator such as here shown entirely displaces the customary tail light and it at the same time serves as a support for the license plate, said plate being attached to projecting lugs 35 forming a part of the inner plate 7.

Third, a single electric globe serves all purposes as far as night service is concerned as it illuminates the tail light lens 5 contained in the upper part of the casing and simultaneously the direction indicating mechanism and the license plate disposed below same, due to the direct and reflected rays projected from the lamp and the upper part of the casing which may be provided with reflecting surfaces or painted white. Fourth, the device is exceedingly simple to operate as it merely requires the operation of one or another of the levers 25 and 26, or both in unison. Fifth, the signaling device is always returned to normal position once the levers are released due to the employment of the springs 18, thereby avoiding the chance of leaving the signal in one or another display position once it has been operated. In other words normal positioning of the signaling device is automatically obtained regardless of the display last made. Sixth, the device may be readily attached to any automobile due to the simplicity of design and size of the same, and while it is preferably constructed of sheet metal or like material, it is obvious that the materials and finish of the several parts employed may be such as the experience and judgment of the manufacturer may dictate or varying uses may demand.

Having thus described my invention, what I claim and desire to secure by Letters Patent is—

1. A direction indicator comprising a plate having an elongated slot formed therein, a pair of plates always forming a partial closure for the slot and slidable along the longitudinal axis of the slot, and means for imparting a sliding movement to the plates independent of each other and in unison, said plates by their movement with relation to the slot and by the different positions assumed forming a series of visible signals.

2. A direction indicator comprising a plate having an elongated slot formed therein and terminating at each end in an arrow-head, a rear plate interspaced with relation to said first named plate, and a pair of intermediate plates slidably mounted to move into or out of register with the arrowheads in the first named plate.

3. In a device of the character described a pair of interspaced plates, one disposed in front of the other, a slot formed in the front plate, said slot having the shape of a double headed arrow, a colored surface formed on the rear plate in register with the double headed arrow shaped slot in the front plate, a pair of plates interposed between the front and rear plate, said plates being slidably mounted and adapted to normally assume a position in register with the arrow heads of the slot, a colored stripe formed on each plate in register with the connecting slot formed between the arrow heads, said stripe being of the same color as that formed on the rear plate in register with the slot, and means for transmitting a sliding movement to the plates to move either out of register with the arrow head portions of the slot.

4. In a device of the character described a pair of interspaced plates, one disposed in front of the other, a slot formed in the front plate, said slot having the shape of a double headed arrow, a pair of plates interposed between the front and rear plate and slidably mounted therebetween, a rearwardly projecting pin on each of said plates, a pair of slots formed in the rear plate through which said pins extend, a casing supporting the plates, a pair of springs one attached to each pin, said springs having their opposite ends attached to the casing and normally adapted to exert a pull on the sliding plates which will maintain them in register with the arrow head portions of the slot formed in the front plate, a pair of flexible cables one attached to each pin, and manually actuated means for exerting a pull on said cables to move either sliding plate out of register with the arrow head portions of the slot formed in the front plate.

5. In a device of the character described a pair of interspaced plates, one disposed in front of the other, a slot formed in the front plate, said slot having the shape of a double headed arrow, a pair of plates interposed between the front and rear plate and slidably mounted therebetween, a rearwardly projecting pin on each of said plates, a pair of slots formed in the rear plate through which said pins extend, a casing supporting the plates, a pair of springs one attached to each pin, said springs having their opposite ends attached to the casing and normally adapted to exert a pull on the sliding plates which will maintain them in register with the arrow head portions of the slot formed in the front plate, a pair of flexible cables one attached to each pin, and manually actuated means for exerting a pull on said cables to move either sliding plate out of register with the arrow head portions of the slot formed in the front plate, said front plate being colored white, said rear plate being colored red where it registers with the double headed arrow shaped slot, said sliding plates being colored white and each having a red color stripe formed thereon in register and in alinement with the slot which connects the arrow heads.

In testimony whereof I have hereunto set my hand in the presence of two subscribing witnesses.

HARRY H. JEWELL.

Witnesses:
W. W. HEALEY,
M. E. EWING.